(12) United States Patent
Henzinger et al.

(10) Patent No.: US 8,868,543 B1
(45) Date of Patent: Oct. 21, 2014

(54) FINDING WEB PAGES RELEVANT TO MULTIMEDIA STREAMS

(75) Inventors: Monika H. Henzinger, Menlo Park, CA (US); Bay-Wei Chang, Foster City, CA (US); Sergey Brin, Palo Alto, CA (US)

(73) Assignees: Google Inc., Mountain View, CA (US); The Board of Trustees of the Leland Stanford Junior University, Palo Alto, CA (US)

( * ) Notice: Subject to any disclaimer, the term of this patent is extended or adjusted under 35 U.S.C. 154(b) by 1956 days.

(21) Appl. No.: 10/408,784

(22) Filed: Apr. 8, 2003

Related U.S. Application Data

(60) Provisional application No. 60/427,555, filed on Nov. 20, 2002.

(51) Int. Cl.
*G06F 7/00* (2006.01)

(52) U.S. Cl.
USPC .......................................... 707/713; 707/768

(58) Field of Classification Search
CPC ..................... G06F 17/30654; G06F 17/30017; G06F 17/30663; G06F 17/30672; G06F 17/30699; G06F 17/30828; G06F 17/30011; G06F 17/30067; G06F 17/30436; G06F 17/30634; G06F 17/30684; G06Q 30/0256
USPC .................. 707/1–104.1, 713, 721, 765–768, 707/748–751
See application file for complete search history.

(56) References Cited

U.S. PATENT DOCUMENTS

| | | | | |
|---|---|---|---|---|
| 5,153,527 A * | 10/1992 | Yaguchi | ........................ | 329/307 |
| 5,826,261 A * | 10/1998 | Spencer | ........................... | 707/5 |
| 5,832,494 A | 11/1998 | Egger et al. | | |
| 5,926,811 A * | 7/1999 | Miller et al. | ..................... | 707/5 |
| 5,983,176 A * | 11/1999 | Hoffert et al. | ................. | 704/233 |
| 6,105,023 A * | 8/2000 | Callan | .............................. | 707/5 |
| 6,452,609 B1 * | 9/2002 | Katinsky et al. | ............. | 715/716 |
| 6,549,897 B1 * | 4/2003 | Katariya et al. | .................. | 707/5 |
| 6,601,026 B2 * | 7/2003 | Appelt et al. | ..................... | 704/9 |
| 6,658,429 B2 * | 12/2003 | Dorsett, Jr. | .................... | 707/708 |
| 6,748,375 B1 * | 6/2004 | Wong et al. | ........... | 707/999.003 |
| 6,799,199 B1 * | 9/2004 | Segal et al. | .................... | 709/207 |
| 6,816,858 B1 * | 11/2004 | Coden et al. | ................. | 707/750 |

(Continued)

OTHER PUBLICATIONS

S.E. Robertson et al.: "Okapi at TREC-7: automatic ad hoc, filtering, VLC and interactive track," 1999, 12 pages.

(Continued)

*Primary Examiner* — James Trujillo
*Assistant Examiner* — Linh Black
(74) *Attorney, Agent, or Firm* — Harrity & Harrity, LLP

(57) ABSTRACT

A media stream, such as a news broadcast, is supplemented with documents that are relevant to the media stream. The documents may be web pages returned from a search engine. A search query generation component generates search queries for the search engine based on the media stream. A post processing component may re-rank and/or filter the documents to enhance the viewing experience for the user.

30 Claims, 7 Drawing Sheets

(56) References Cited

U.S. PATENT DOCUMENTS

| | | | |
|---|---|---|---|
| 6,999,957 B1* | 2/2006 | Zamir et al. | 707/3 |
| 7,440,943 B2* | 10/2008 | Grasso et al. | 707/736 |
| 2002/0174119 A1* | 11/2002 | Kummamuru et al. | 707/6 |
| 2003/0004966 A1* | 1/2003 | Bolle et al. | 707/104.1 |
| 2003/0037041 A1* | 2/2003 | Hertz | 707/1 |
| 2003/0105589 A1* | 6/2003 | Liu et al. | 702/1 |
| 2003/0115187 A1* | 6/2003 | Bode et al. | 707/3 |
| 2003/0137531 A1* | 7/2003 | Katinsky et al. | 345/716 |
| 2003/0144994 A1* | 7/2003 | Wen et al. | 707/3 |
| 2003/0149727 A1* | 8/2003 | Jaschek et al. | 709/206 |
| 2003/0171910 A1* | 9/2003 | Abir | 704/1 |
| 2004/0002848 A1* | 1/2004 | Zhou et al. | 704/2 |
| 2004/0054661 A1* | 3/2004 | Cheung et al. | 707/3 |
| 7,630,986 B1* | 12/2009 | Herz et al. | 707/999.01 |
| 7,660,819 B1* | 2/2010 | Frieder et al. | 707/999.107 |
| 2001/0014868 A1* | 8/2001 | Herz et al. | 705/14 |
| 2002/0082901 A1* | 6/2002 | Dunning et al. | 705/10 |
| 2002/0123989 A1* | 9/2002 | Kopelman et al. | 707/3 |

OTHER PUBLICATIONS

Peter D. Turney: "Learning Algorithms for Keyphrase Extraction," *Information Retrieval*, Oct. 4, 1999, pp. 1-46.

Bradley J. Rhodes: "Just-In-Time Information Retrieval," PhD Thesis, MIT Media Laboratory, Cambridge, MA, May 2000, pp. 1-154.

Alberto Muñoz: "Compound Key Word Generation from Document Databases Using a Hierarchical Clustering ART Model," Intelligent Data Analysis 1 (1997), pp. 25-48.

"IR Contents: An Overview of Information Retrieval (IR)", Yale University, Feb. 1, 2001, ycmi.med.yale.edu/nadkarni/db_course/IR_Contents.htm, 5 pages.

J. Stephen Downie, "LIS 601: Week3: TF IDF weighting, Term Weighting: TF*IDF", Sep. 25, 1997, http://instruct.uwo.ca/gplis/601/week3/tfidf.html, 1 page.

Salton, G., Wong, A., Yang, C.S., A Vector Space Model for Automatic Indexing, (In Communications of the ACM, vol. 18, No. II, pp. 613-620), Nov. 1975.

\* cited by examiner

FINDING WEB PAGES RELEVANT TO MULTIMEDIA STREAMS

RELATED APPLICATIONS

This application claims priority under 35 U.S.C. §119 based on U.S. Provisional Application No. 60/427,555, filed Nov. 20, 2002, the disclosure of which is incorporated herein by reference.

BACKGROUND OF THE INVENTION

A. Field of the Invention

The present invention relates generally to web page searches, and more particularly, to finding web pages relevant to a stream of information.

B. Description of Related Art

Many daily activities present information in the form of a stream of information, such as a stream of text or a multimedia stream. For example, radio and television news broadcasts provide a one-way stream of information to the viewers. Telephone calls, meetings, simple conversations with others, web browsing, desktop productivity applications (e.g. word processing, presentation generation, and email applications, etc.) also present information in the form of a stream. Often, people using this information could benefit from supplemental information related to the topics that are being discussed.

The World Wide Web presents a convenient source of supplemental information. Supplementing television broadcasts is particularly attractive due to the passive nature of television viewing. Interaction is severely constrained, usually limited to just changing the channel. There is no real way for the viewer to direct what kind of information will be presented.

One known attempt to supplement television broadcasts with web pages involves broadcasting entire hyper-text markup language (HTML) pages in unused portions of the television signal. A user watching television on a computer with a compatible television tuner card can then view these pages, even without an Internet connection.

Another known attempt to supplement television broadcasts involves broadcasting URLs in an alternative data channel interleaved with closed caption data. When a specially equipped box detects one of these URLs, it displays an icon on the screen through which the viewer may direct the box to fetch the corresponding web page over the Internet.

Both of these attempts to supplement television broadcasts, however, require the content producer to choose relevant documents and encode these documents (or document URLs) into the broadcast. This can be expensive for the producer and limits the viewer in both the number of broadcasts available with supplemental information and in the content of the supplemental information that the producer selected.

Thus, it would be desirable to better supplement multimedia broadcasts such as television broadcasts.

SUMMARY OF THE INVENTION

Systems and methods consistent with the present invention find documents relevant to a multimedia stream by forming a search query based on the stream and using the search query to access a search engine.

One aspect of the invention is directed to a method of locating documents relevant to a media stream. The method includes generating search queries from a text stream corresponding to the media stream, receiving documents relevant to the media stream based on the search queries, and associating the received documents and the media stream together for presentation to a user.

A second aspect of the invention is directed to a device that includes at least one display device for simultaneously presenting a multimedia stream and a web document related to topics in the multimedia stream. The device further includes a query generation component configured to periodically generate search queries based on a content of the multimedia stream. The search queries result in a set of ranked web documents related to topics in the multimedia stream. A post processing component re-ranks the set of web documents based on relevance to the multimedia stream.

Another aspect of the invention is directed to a system for locating documents relevant to a media stream. The system includes a text converter, a query generation component, a search engine, and a display device. The text converter convert the media stream into a corresponding stream of text. The query generation component generates search queries from the stream of text. The search engine generates a set of documents relevant to the stream of text based on the search queries, where the set of documents are ranked according to relevance. The display device displays highest ranking ones of the set of documents to a user of the media stream.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention. Instead, the scope of the invention is defined by the appended claims and equivalents.

As described herein, a media stream is supplemented with external documents, such as web pages, relevant to the media stream. The external documents are gathered based on search queries derived from the content of the media stream.

Exemplary System Overview

Figure 1:
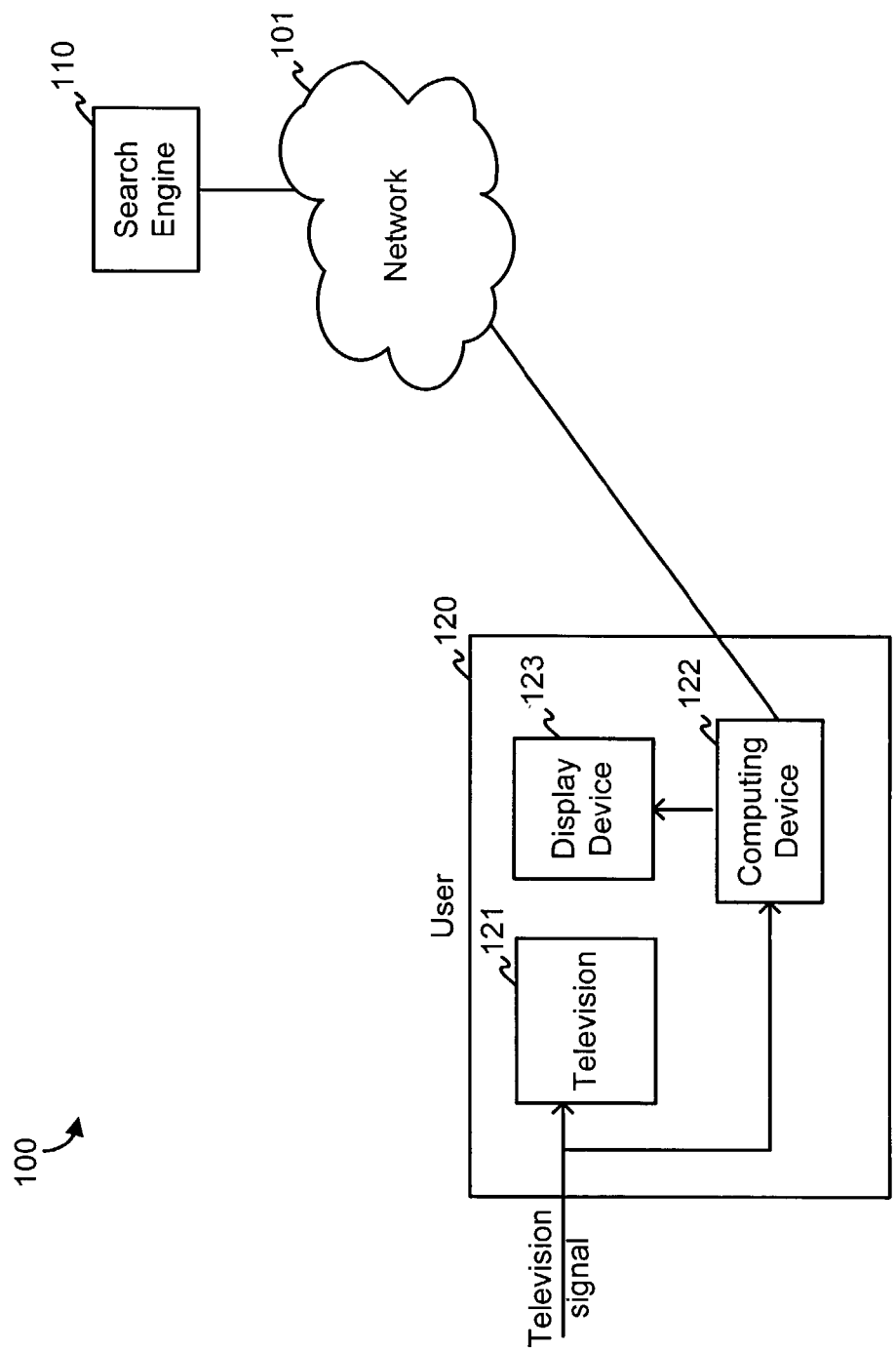
FIG. 1 is a diagram illustrating an exemplary system in which concepts consistent with the invention may be implemented.

FIG. 1 is a diagram illustrating an exemplary system in which concepts consistent with the invention may be implemented. System 100 may include a network 101, such as the Internet. Numerous entities may be connected to network 101, two of which are shown in FIG. 1: search engine 110 and user device 120.

Search engine 110 may index and provide search services for a collection of documents. The documents may be, for example, a collection of web pages publicly available on the world wide web. Such a collection of web pages may include approximately one billion or more web pages. In operation, search engine 110 may receive search queries, and based on the search queries, return a set of web pages or a set of links to web pages that the search engine 110 determines are relevant to the search query. The web pages in the returned set may be ranked by the search engine so that the web pages more relevant to the search query are given a higher rank than less relevant web pages. Search engines 110 are generally known in the art, and thus, the operation of search engine 110 will not be described in additional detail.

User device 120 may generally denote an end user device that presents/operates on a media stream, such as a multimedia stream. The media stream may be, for example, a television or radio broadcast. In the exemplary system shown in FIG. 1, a television broadcast is illustrated. Although system 100 may include multiple user devices 120, only one is shown for descriptive clarity.

A user may view the television signal on a conventional television 121. The television signal may also be input to a computing device 122, such as a personal computer, which converts the signal to a stream of text. In the case of a television signal, computing device 122 may, for example, extract closed caption information from the signal to obtain the text stream. Based on the text stream, computing device 122 may query search engine 110 for documents relevant to the television broadcast. These documents may be displayed on display device 123. Display device 123 may be, for example, a conventional computer monitor.

The user may thus simultaneously (or with a few seconds delay) experience the television broadcast through television 121 and browse web pages that supplement the information in the television broadcast. The web pages may automatically update as the television broadcast progresses. If the user is particularly interested in a particular web page, computing device 122 may allow the user to select the web page for further viewing or archiving.

Television and radio news broadcasts are two examples of media streams that are particularly suited to being supplemented with web documents. Other types of audio, video, or multimedia broadcasts may, however, also be used. In one aspect of the present invention, multimedia or textual documents stored locally, such as on computing device 122, may be supplemented with web documents. For example, text from (or generated from) a file or a textual stream generated by a user typing a document may be supplemented with web documents. The textual stream may be obtained from a user's direct input, such as via a keyboard, or may be based on a user's selection of portions of a document, such as highlighting of a portion of the document. Similarly, the location of the input cursor or mouse pointer within a portion of a document or file (and, for example, optional information regarding or derived from the change in location over time) can be used to generate a source of information (e.g. a word, a sentence, a paragraph, an entire document, etc.) to be supplemented via the methods described in other aspects of the present invention.

Additionally, although television 121 and display device 123 are illustrated as two separate components in FIG. 1, in operation, the television broadcast may be displayed next to the supplemental web documents on a single monitor.

Figure 2:
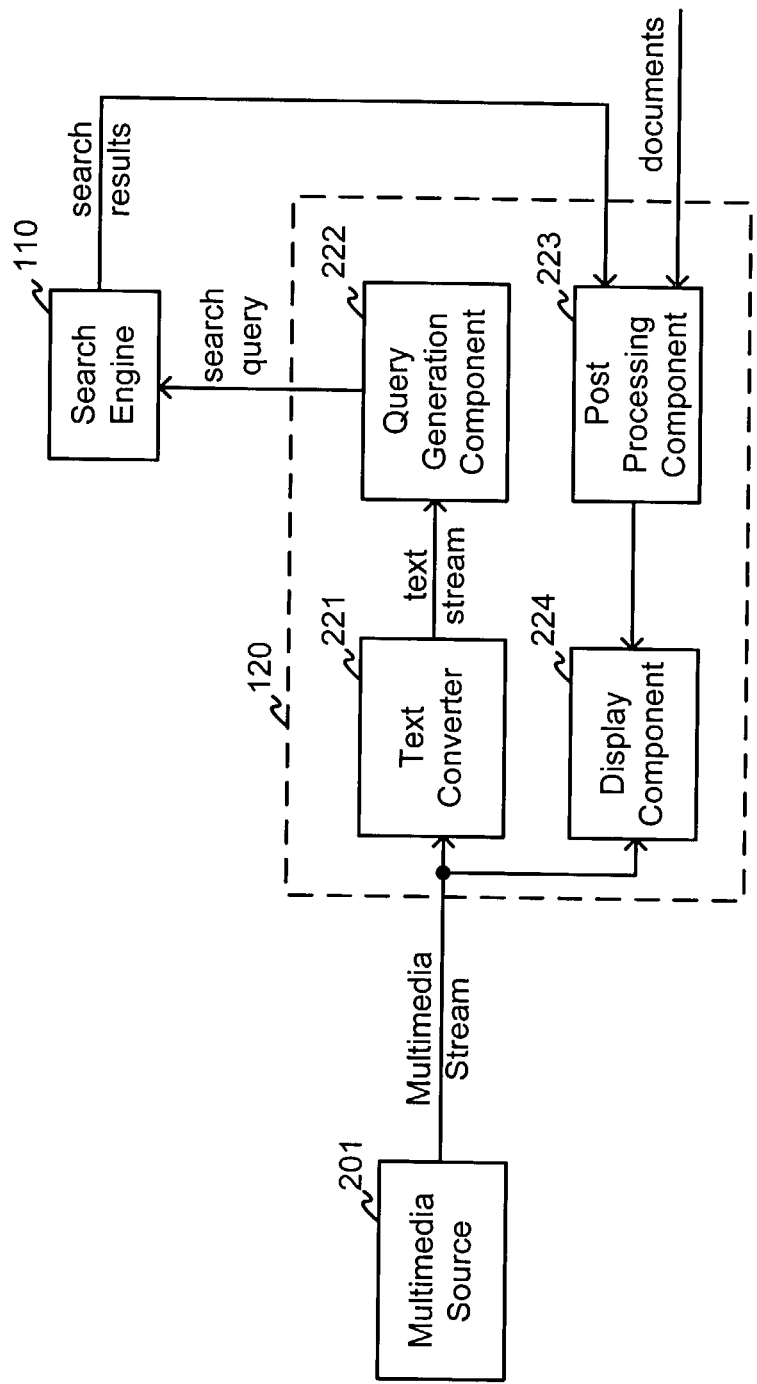
FIG. 2 is a diagram illustrating functional components used to supplement multimedia broadcasts consistent with an aspect of the invention.

FIG. 2 is a diagram illustrating functional components that may be used to supplement multimedia broadcasts consistent with an aspect of the invention. A multimedia source 201 may provide a media stream that is received by a user 120. The media stream may be converted to a textual stream by text converter 221. Text converter 221 may be implemented in a number of ways depending on the type of multimedia broadcast. For television broadcasts, for example, text converter 221 may get a corresponding textual stream from the closed-caption information in the television signal. Alternatively, text converter 221 may use automated speech recognition techniques to convert audio information from television or radio broadcasts to text. In implementations in which the input media stream is a video, audio, or text document stored locally to user 120, "multimedia source" 120 may be, for example, a local hard drive or a stream of information received from the user.

Query generation component 222 derives search queries from the textual stream. The goal of query generation component 222 is to generate queries relevant to the topics contained in the textual stream. Such queries may be generated periodically, such as every 15 seconds, from the text received in the previous period. In this manner, a series of search queries, each relevant to the current topic in the multimedia stream, are generated.

The generated search queries may be input to a search engine 110, which, as previously mentioned, may index documents (i.e., web pages) on the world wide web. Search engine 110 may thus return a list of URLs (links) that point to web pages. The search results from search engine 110 can the be used to retrieve the corresponding documents from their host locations (e.g., from servers on the web). In some implementations, search engine 110 could also store the actual documents as well as an indexed version of the documents.

The set of documents retrieved based on the results of search engine 110 (or links to the documents) may be processed by post processing component 223 and then displayed to a user on display component 224. Post processing component 223 filters the returned documents so that ideally, only relevant and non-redundant documents are displayed to the user. Display component 224 may correspond to television 121 and/or display device 123.

Display component 224 may include, for example, a television, personal computer, or a combination of both a television and a personal computer. Through display component 224, a user may view the original media stream and simultaneously view the documents from post processing component 223. For example, a user may watch a news broadcast on television and simultaneously view web pages that supplement topics discussed in the news broadcast. The displayed web pages may change as the news broadcast progresses. Web pages of particular interest may be selected by the user for further viewing.

In one implementation, query generation component 222 and post processing component 223 may be implemented by computing device 122. In other implementations, one or both of these components may be implemented externally to user device 120, such as at search engine 110.

Figure 3:
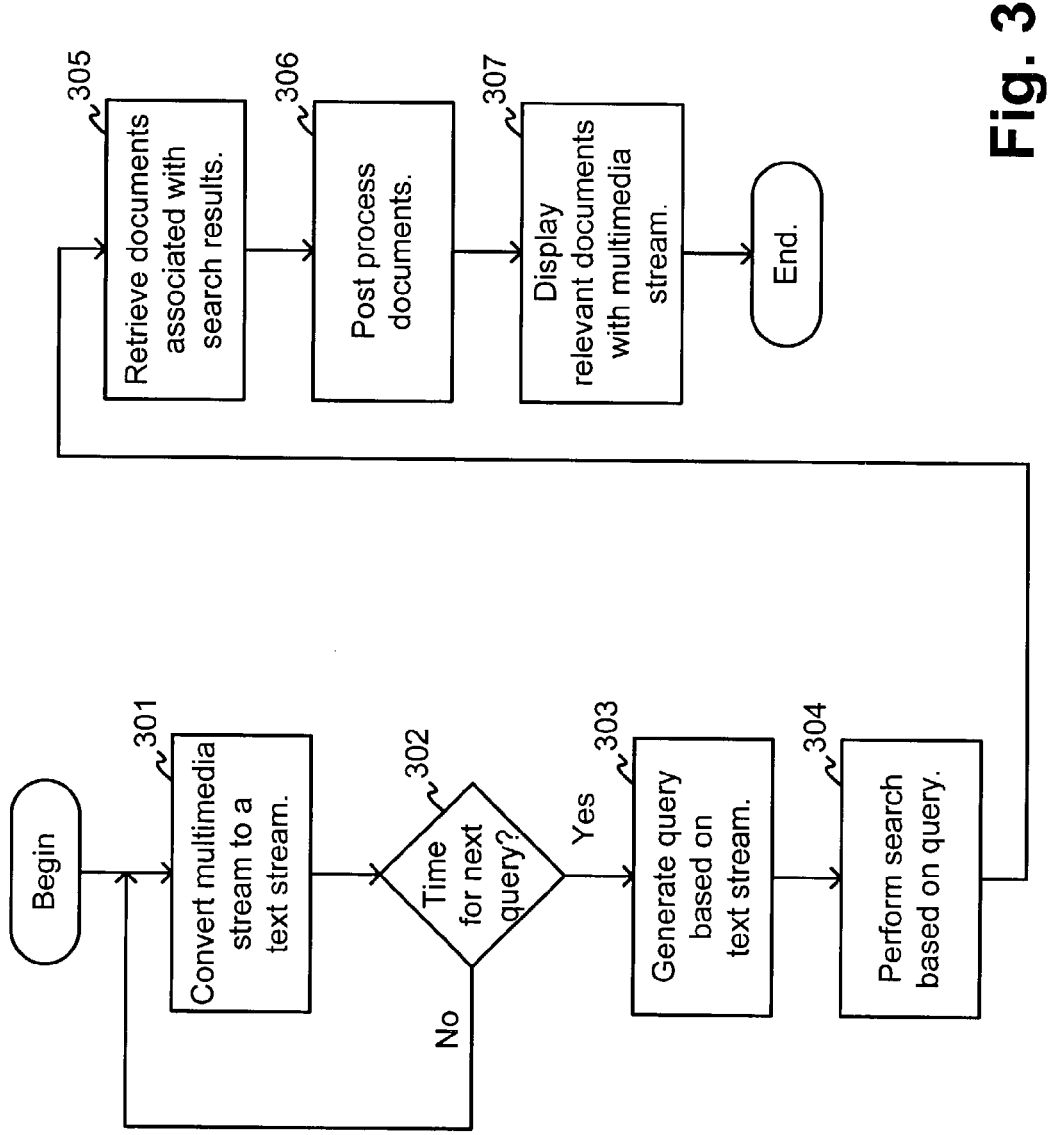
FIG. 3 is a flow chart illustrating methods of operating the functional components shown in FIG. 2.

FIG. 3 is a flow chart illustrating methods of operating the functional components shown in FIG. 2. To begin, text converter 211 converts the media stream to a stream of text (Act 301). From the text stream, search queries are periodically generated (Acts 302 and 303). A search query may be generated every s seconds (e.g., s=15).

Assume that the stream of text generated during the s seconds is labeled as text segment T. In this case, a search query based on segment T (and possibly based on previous segments T) would be generated every s seconds.

Each search query may be input to search engine 110, which returns a list of references to potentially relevant documents (Act 304). The list may be sorted based on a determination by the search engine of the relevancy or importance of the documents. The list may be used to retrieve the set of actual documents (Act 305). A maximum number of documents from the list, such as 15, may be retrieved. In some implementations, search engine 110 may perform Acts 304 and 305, thus returning the set of actual documents.

Post processing component 223 may filter the set of relevant documents to return a set number of the most relevant documents (e.g., the two most relevant documents) (Act 306). Post processing component 223 may perform other functions, such as removing redundant documents from the set.

Finally, in Act 307, the most relevant documents may be displayed to the user simultaneously (or after a slight delay) with the broadcast signal.

Search Query Generation

As mentioned, query generation component 222 derives search queries from text segments T. The search query may include terms in segment T that define the topic being discussed. Consistent with an aspect of the invention, a number of techniques are possible for generating such queries. These techniques will now be described. One of ordinary skill in the art will recognize that variations on the techniques described below, or combinations of these techniques, may also be used.

The Baseline Technique (A1-BASE):

The inverse document frequency (idf) of a term is defined as a function of the frequency f of the term in a collection and the number N of documents in the collection. In the context of a web search engine, the collection may refer to the set of web pages (documents) indexed by the search engine. More specifically, the idf may be defined as $$\log\left(\frac{N}{f+1}\right).$$

Higher idf values indicate that a term is relatively more important than a term with a lower idf value. For a web search engine, N may be equal to approximately 1 billion documents. In other implementations, frequency f may refer to the frequency of occurrence of terms in the text stream instead of a collection of web pages.

In situations in which the media stream is a television broadcast, it may be the case that there is a difference in word use between the documents in the collection and in the spoken broadcast. In these situations, some words may have a low idf for the television broadcast and a high idf in the document collection indexed by the search engine. For television news broadcasts, examples of such words are "reporter" and "analyst." In other words, these words tend to be relatively common in television news broadcasts but relatively uncommon in the document collection indexed by the search engine. Accordingly, in the baseline technique, and in the other techniques described below, these terms are ignored in the text segments T.

The baseline technique is based on the formula:

$$tf \cdot idf, \tag{1}$$

where tf is the frequency of the term in the text segment T. Each term in the text segment T has its baseline value computed using formula (1). A predetermined number of the terms with the highest value are returned as the search query. For example, the two terms in text segment T with the highest values may be used as the search query.

With the baseline technique, query generation component 222 gives distinctive terms more weight than common terms. Terms used multiple times are given more weight than terms used once.

A variation on formula (1) may use just tf in calculating the term values. Other variations may use a combination of the idf computed based on web documents and the text stream.

The Modified Baseline Technique (A2-BASE):

Query generation component 222 applies the modified baseline technique similarly to the baseline technique, except that the following formula is substituted for formula (1):

$$tf \cdot idf^2. \tag{2}$$

The motivation here is that rare words, such as named entities, are particularly important for issuing focused queries. Thus, idf is more important than tf.

One of ordinary skill in the art will recognize that other functions of tf and idf may be used instead of formula (2).

The Simple Stemming Technique (A3-STEM):

In the previous two technique, query generation component 222 assigns each term in text segment T a weight. A3-STEM instead assigns a weight to each stem, where the stem of a term is approximated by taking the first five letters of the word. For example, congress and congressional would share the same stem, congr. In this manner, the weight of terms that describe the same thing are aggregated. One of ordinary skill in the art will appreciate that more or fewer than five letters could be used to define a stem. Also, other techniques can be used to define stems. For example, known programs exist for finding stems and could be used.

Figure 4:
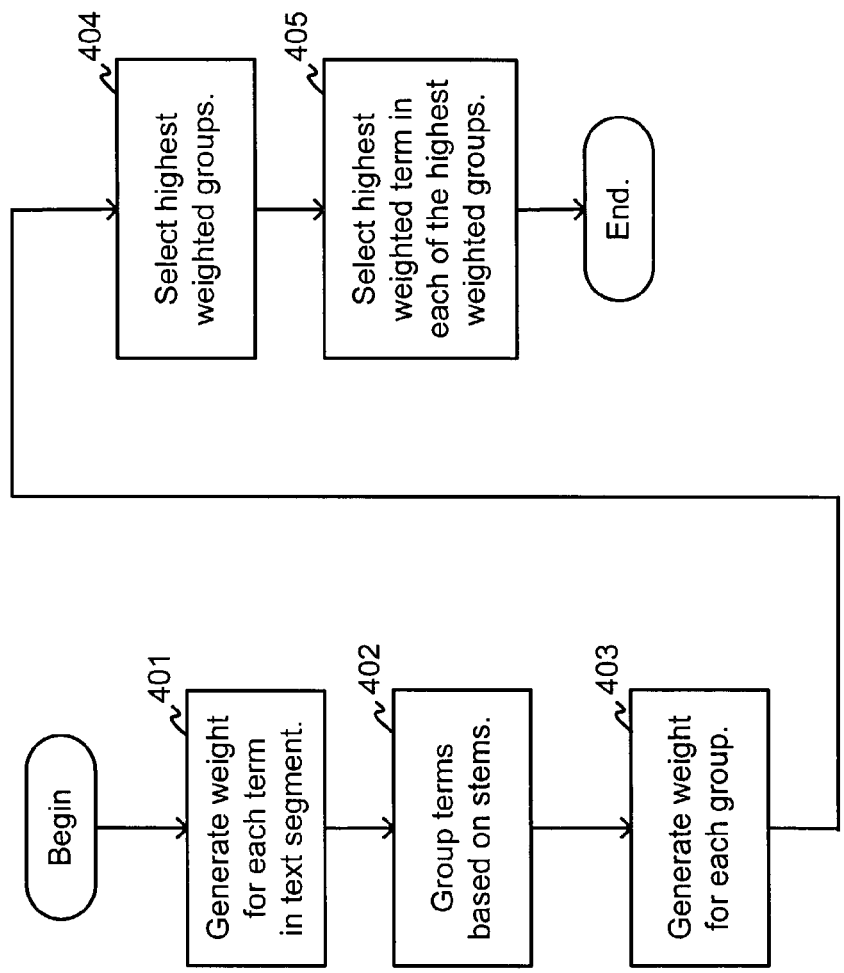
FIG. 4 is a flow chart illustrating the a search query generation technique according to one implementation.

FIG. 4 is a flow chart illustrating the A3-STEM technique in additional detail. To begin, query generation component 222 may calculate the weight of each term in the text segment T (Act 401). The weight may be computed as:

$$c \cdot tf \cdot idf^2, \tag{3}$$

where c is equal to one if the term is a noun and 0.5 otherwise. Using the factor c tends to emphasize nouns, which are often more useful for formulating focused queries.

The terms may then be grouped based on their corresponding stems (Act 402). That is, terms with the same stems are assigned to the same group. A weight can then be calculated for each group as the sum of the weights of all the terms in the group (Act 403). Functions other than a sum may alternatively be used to combine the weights of the terms in a group to find a weight for the group.

After each group is assigned a weight, query generation component 222 sorts the groups based on their weight. The top X groups, where X is a positive integer (e.g., two), having the highest weights are selected as groups from which terms for the search query may be selected (Act 404). Finally, for each of these top X groups, the term within the group that has the largest weight is selected to represent that group in the search query (Act 405). In this manner, the search query will contain X terms, selected as one term corresponding to each of the most relevant stems.

The Stemming Technique with Compounds (A4-COMP):

This technique is similar to the simple stemming technique, except that the stems are extended to also include two word compounds. Stems may be built not only for one word terms, but also for two word terms. Compound stems are computed by stemming both terms in the compound. For example, the compound "veterans administration" has the stem "veter-admin."

Compound stems may be constructed for any two adjacent terms that are in a predefined list of possible compounds. This list of allowed compounds can be compiled from the documents in the document collection indexed by the search engine. In particular, terms that occur frequently together, such as "veterans administration," may be classified as a possible compound.

Compounds may be located through techniques other than stemming. For example, for each word, a list of all compounds containing that word could be stored.

In constructing the search query, the compounds are treated like terms in the methods shown in FIG. 4, with the exception that c in formula (3) may be modified for compounds. For example, c may be set to one if the term is a non-compound noun, 1.2 if the term is a compound, and 0.5 otherwise. Since a compound consists of two words, the resultant query may contain more than X terms. For example, when X is two, the resultant query may contain two, three, or four words. Compounds located in a text segment T can be used in techniques other than A3-STEM, such as A1-BASE.

The History Technique (A5-HIST):

This technique is similar to A4-COMP but also includes a history feature. The previously discussed technique used the current text segment T when generating the search query. A5-HIST may use, in addition to the current text segment T, previous text segments. The rationale for this technique is that context leading up to the current text segment T may contain terms that are still valuable in generating the query.

Figure 5:
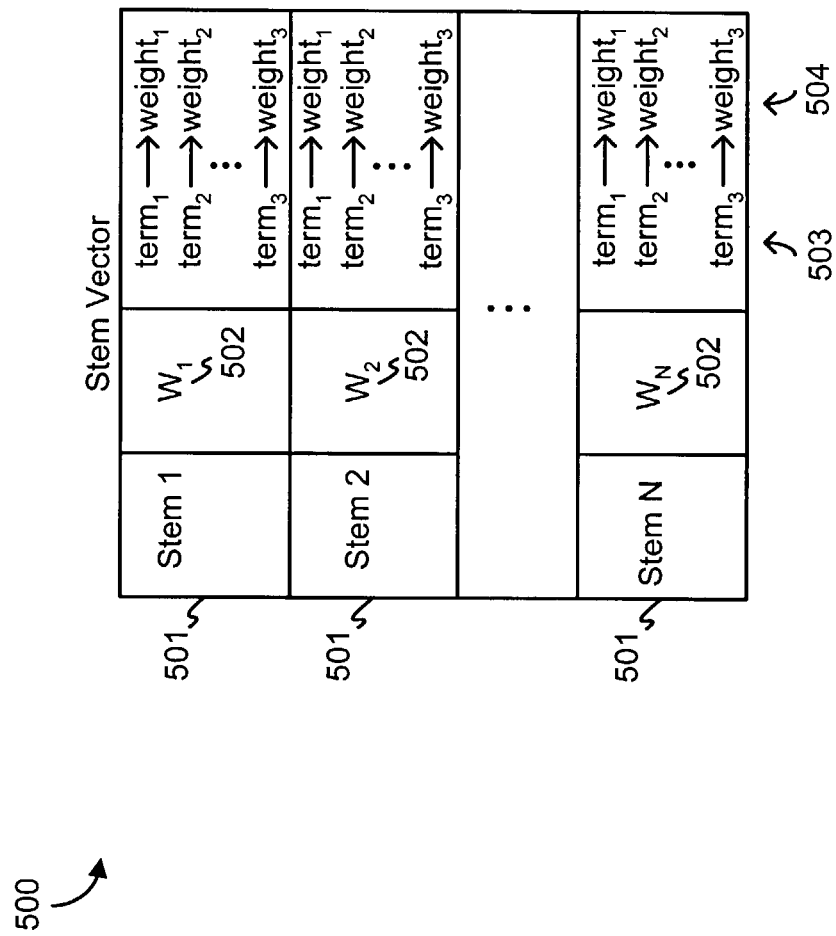
FIG. 5 is a diagram illustrating a stem vector.

The history technique keeps a stem vector that represents some or all of the text seen for previous text segments. FIG. 5 is a diagram illustrating a stem vector 500.

Stem vector 500 corresponds to the stem groups generated in technique A3-STEM for a particular text segment. Technique A4-COMP may alternatively be used to generate the stem groups. In particular, stem vector 500 includes one or more stems, stem1 through stemN 501, (which correspond to the groups generated in A3-STEM or A4-COMP). Each stem 501 includes a corresponding weight $W_1$ through $W_N$ 502. As previously described with reference to Act 403, weights 502 can be calculated for each stem 501 as the sum of the weights of all the terms in the group. Terms 503 and corresponding weights 504, for each term in each of stems 501, may also be stored in stem vector 500.

Query generation component 222 may store stem vectors corresponding to the current text segment T and also a number of previous text segments. For example, the three most previous text segments may be used.

Figure 6:
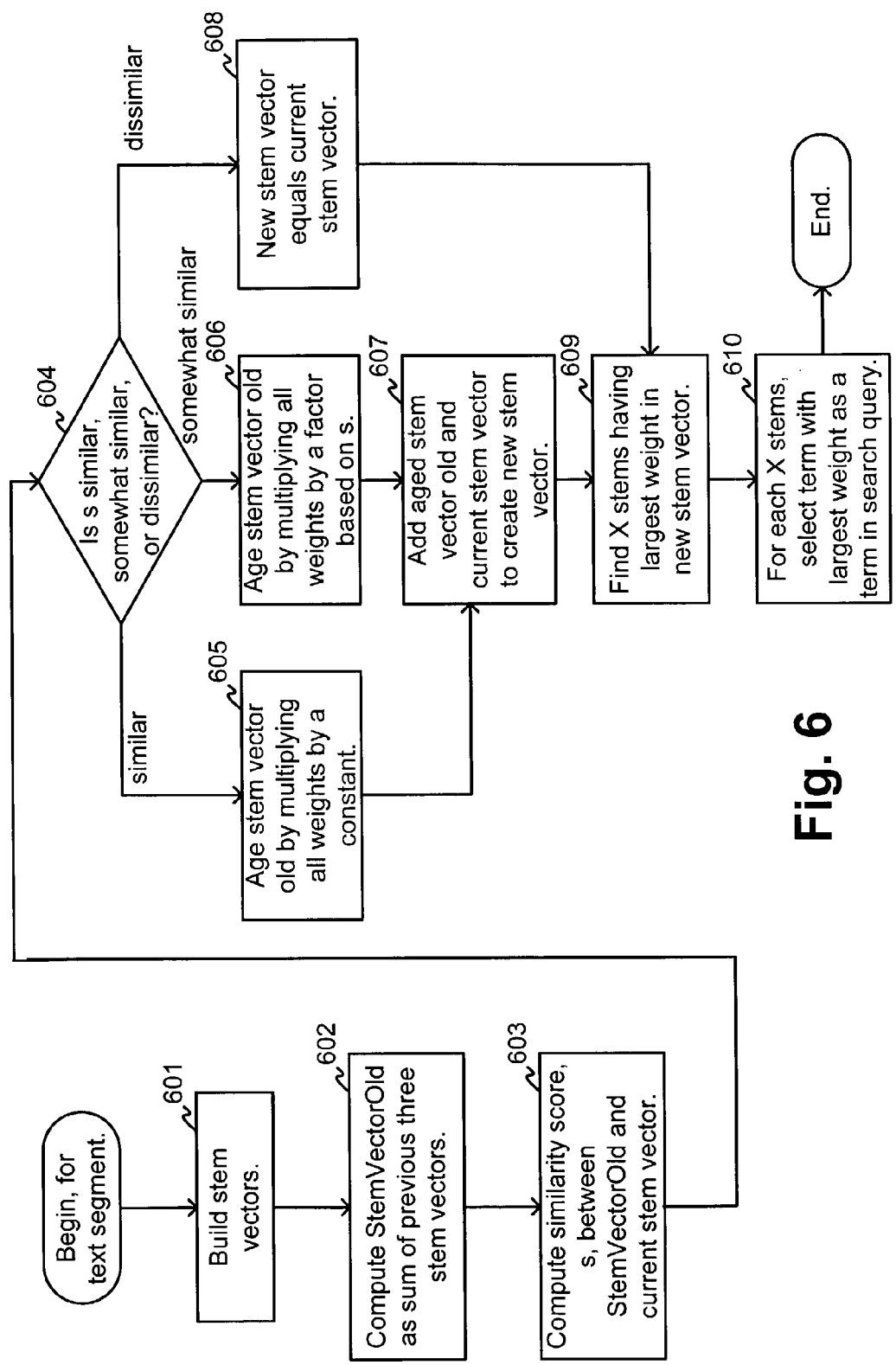
FIG. 6 is a flow chart illustrating another search query generation technique.

FIG. 6 is a flow chart illustrating the A5-HIST technique in detail. To begin, query generation component 222 may build stem vectors 500 corresponding to the current text segment T and the previous three text segments (Act 601). That is, in this implementation, four stem vectors 500 are used. The use of the three previous text segments as history information can be modified in other implementations to be more or less than three.

The stem vectors corresponding to the three previous text segments are summed (Act 602) to form a stem vector labeled StemVectorOld. When adding stem vectors, the stem vectors may be expanded to have the same stems and terms by suitably adding missing stems and terms with a weight of zero. Then, the two vectors are added by adding the corresponding weights of the stems and of the terms.

Query generation component 622 may then compute a similarity score, s, between StemVectorOld and the current stem vector (Act 603). The similarity score may be computed as the dot-product of StemVectorOld and the current stem vector in which only the weights of the terms are used and the weights of the stems are ignored.

The similarity score s calculated in Act 603 may then be used to classify StemVectorOld as either similar, somewhat similar, or dissimilar to the current stem vector (Act 604). A "similar" similarity score implies that the topic has stayed the same. Accordingly, it is appropriate to use previous text segments in calculating the search query. A "somewhat similar" similarity score implies that the topic may be changing. The previous text segments are still used in calculating the search query, but the influence of the previous text segments is deemphasized. A "dissimilar" similarity score indicates that the topic has changed and the previous text segments are not used to generate the search query.

The determination of whether the similarity score is "similar," "somewhat similar," or "dissimilar" may be based on comparison of the similarity score s to threshold levels $a_1$ and $a_2$. If the similarity score is above $a_1$, then text segment T is considered to be similar. If the similarity score is between $a_1$ and $a_2$, then text segment T is considered to be somewhat similar. If the similarity score is below $a_2$, then text segment T is considered to be dissimilar. The thresholds $a_1$ and $a_2$ may be selected based on an empirical analysis of the media broadcasts. For example, in one implementation, $a_1$ is set at 0.001 and $a_2$ is set at 0.0003.

When text segment T is similar, StemVectorOld may be "aged" by multiplying every weight by a factor, such as 0.9. The factor 0.9 is not critical and may be adjusted up or down (Act 605). When text segment T is somewhat similar, StemVectorOld may be aged by multiplying by a factor less than the factor used when text segment T is similar (Act 606). In one implementation, this factor may be based on s, such as $0.9^{2-(1000)s}$. In this implementation, the factor used in Act 606 will be less than 0.9, i.e., the weights are more decreased than in the case when T is similar to the previous text segments.

The aged version of StemVectorOld that is calculated in Acts 605 or 606 may next be added to the current stem vector to create a new stem vector (Act 607).

When text segment T is dissimilar, StemVectorOld is ignored and the current stem vector is used as the new stem vector (Act 608). Stated differently, in this situation, the weights in StemVectorOld may be reset to zero, and then StemVectorOld may be added to the current stem vector as in Act 607.

The new stem vector formed in Acts 605-608 may then be used to determine the search query in a manner similar to the search query formed in Acts 404 and 405 of the simple stemming technique. That is, query generation component 222 may find the X stems that have the largest weight in the new stem vector (Act 609). X may have a value of two. For each of these top X stems, the term within the stem that has the largest weight is selected to represent that stem in the search query (Act 610).

The specific history technique described above uses previous text segments as well as the current text segment to generate a search query. The general idea is that text segments from the recent past may be useful in formulating the current search query. Other history-based techniques to generate search queries may also be used. For example, technique A 1-BASE may be applied to the above history-based technique to generate search queries without using stemming.

The Query Shortening Technique (A6-THREE):

The previous search query generation techniques generate queries with two to four terms (i.e., X is generally set at two or more). One term queries are often not specific enough, returning a wide variety of results that are mostly not relevant. Three (and greater) term queries, however, run the risk of being too specific as to return no results.

The query shortening technique may operate to reduce the length of search queries that are too specific. In particular, search generation component 222 may initially generate a search query using any of the previously described five search query generation techniques. If the search query returns no results, search generation component 222 shortens and reissues the search query. In particular, for an initial three or more term query that returns no results, the search generation component 222 may remove the lower weighted terms in the query to return the top-weighted terms and then reissue the query.

Other specific query shortening techniques may be used to shorten a search query. For example, queries can be logically ORed to shorten multiple queries with common terms.
Technique A7-IDF:

Technique A7-IDF may be identical to A5-HIST, with $idf^2$ replaced by idf.

Post Processing

When the time period for each text segment is set at a period that is short, several successive queries may be issued on the same topic. These queries may yield similar result sets and many identical or near identical pages may end up being shown to the user. In one empirical test, across 99 technique/data combinations, an average of 34% of the returned URLs were near-duplicates. Such a large number of duplicates may lead to a poor user experience.

In general, post processing component 223 enhances the quality of the search results. One way post processing component 223 performs this is by examining the search results, and if a result is a duplicate or near duplicate of one that has already been presented to the user, it selects the next result in the ranking. Another way that post processing component 223 can enhance search results is by re-ranking the returned search results to more closely correspond to the text segment.

In order to increase the efficiency of post processing component 223, instead of fetching the entire article corresponding to each search result, in some implementations, post processing component 223 may only operate based on titles and summaries of the documents. Search engine 110 may return the titles and summaries as part of normal search result generation. In other implementations, post processing component 223 may fetch the entire documents for all of the search results.

The post processing techniques performed by post processing component may include boosting, similarity ranking, and filtering. These techniques can be used in conjunction with one another. For example, returned documents can be boosted and then filtered. Each of these techniques is described further below.
Boosting:

Search engine 110 may get a two word query and does not know anything else about the text stream. The idea behind boosting is to use additional high-weighted terms to select the most relevant documents from the search results.

To implement boosting, post processing component 223 receives the search query from query generation component 222. Additionally, query generation component 222 transmits additional terms to post processing component 223 outside of the X terms in the search query. For example, if X is equal to two, query generation component 222 may use the top two terms for the search query but return the top X+three (five) terms to post processing component 223. The three additional terms and their weights are referred to as boost terms and boost values herein.

In the boosting process, post processing component 223 re-ranks the documents returned from the search by computing a weight for each result based on the boost terms. In one implementation, for a boost term which has IDF idf and occurs f times in the document returned with the result, the weight for the document may be incremented by the value $(idf\cdot 4\ f)/(f+3)$. The weight may be further incremented for boost terms in the title according to the formula $(idf\cdot 8\ f)/(f+3)$. The documents may then be re-ordered based on their incremented weights.
Similarity Re-Ranking:

Another technique through which post processing component 223 may refine the returned document rankings is to perform a similarity ranking of the current text segment T relative to the text of the returned documents. In particular, post processing component 223 may estimate similarity by generating a similarity vector for the current text segment T in which each term of the text segment T is assigned a weight according to:

$$tf \cdot idf,$$

where, as in the baseline technique, tf is the frequency of the term in the text segment T and idf is the inverse document frequency. Post processing component 223 also generates a similarity vector for each term in one of the returned documents (or, in some implementations, for the first 500 terms of the returned document). Based on these two vectors, a similarity value is calculated as the dot product of the two vectors.

A similarity value may be similarly calculated for each of the returned documents and the returned documents ranked by these similarity values.
Filtering:

Post processing component 223 may filter returned documents to remove documents that are dissimilar to the current text segment T. Additionally, when the issued search query is too vague, the top returned documents are often very dissimilar. Thus, in this situation also, post processing component 223 may filter returned documents to discard such documents unless they are highly similar to the text segment T.

Figure 7:
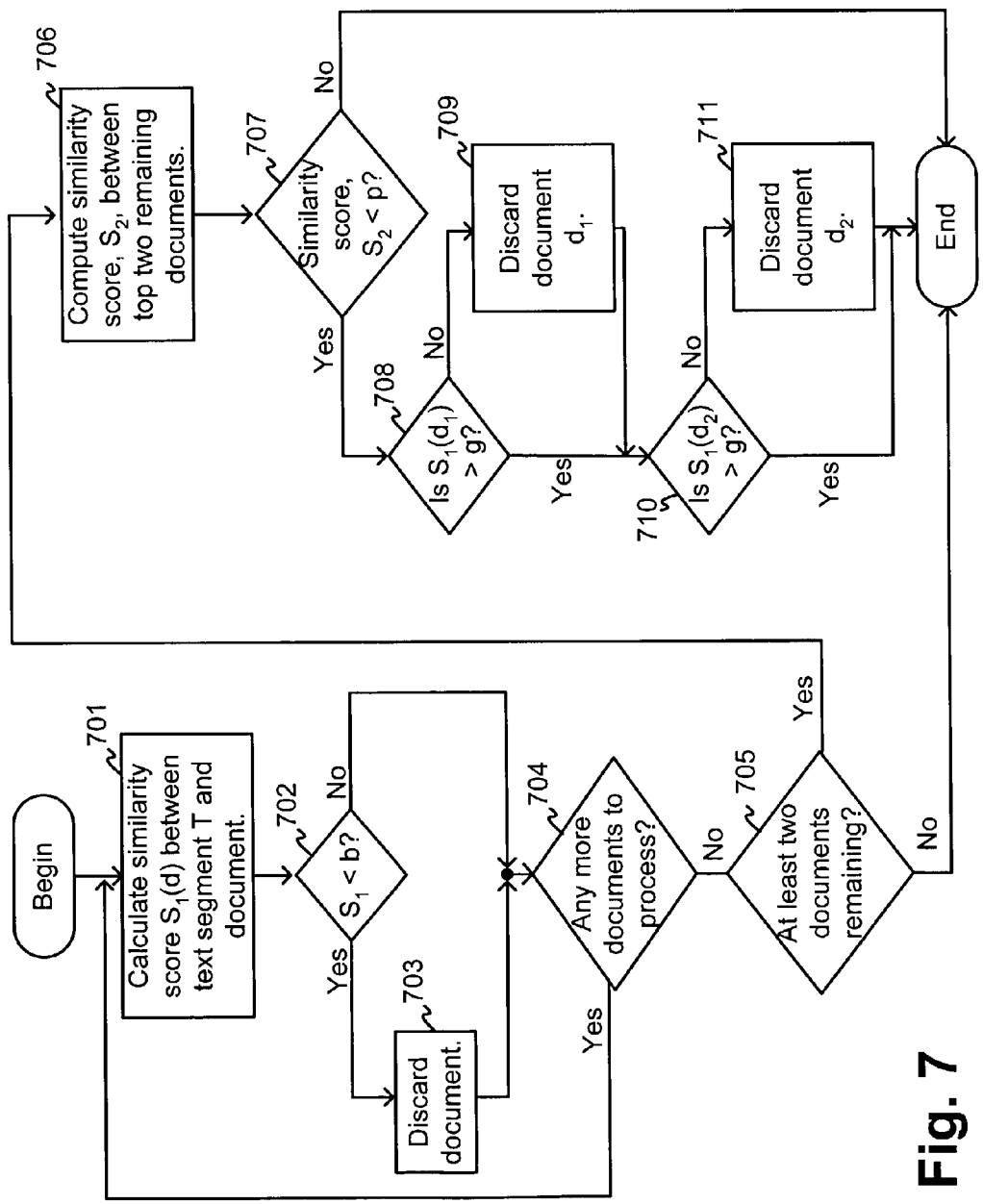
FIG. 7 is a flow chart illustrating post processing via filtering.

FIG. 7 is a flow chart illustrating an exemplary filtering technique in additional detail.

Post processing component 223 may begin by calculating a similarity score, $s_1(d)$, between the current text segment T and a document d (Act 701). The similarity score between the text segment T and the current document is calculated as described above in the similarity re-ranking technique. That is, a weighted term vector is constructed for the text segment and the document in which the weights are based on tf·idf. The dot-product of the two vectors is taken to generate the similarity score.

If $s_1(d)$ is below a threshold b, the document is discarded (Acts 702 and 703). This indicates that the document d is not similar enough to the text segment. The threshold b may be set at, for example, 0.1. Acts 701-703 may be repeated for each document in the returned set of relevant documents (Act 704).

If there are at least two documents remaining after Act 704, (Act 705), the top two documents may additionally be compared to one another to determine if these documents are dissimilar to one another. In particular, post processing component 223 computes a second similarity score, $s_2$, between these two documents. The second similarity score $s_2$ may be computed as the dot-product of the two vectors formed from the two documents (Act 706). Assume that these two documents are called $d_1$ and $d_2$. If $s_2$ is less than a second threshold, p, and the similarity score $s_1(d_1)$ for the first document of the pair is less than a third threshold, g, then the first document $d_1$ may be discarded (Acts 707-709). Similarly, if $s_2$ is less than p and the similarity score $s_1(d_2)$ is less than g, then document $d_2$ may be discarded (Acts 710 and 711). In one implementation, p may be equal to 0.35 and g may be set equal to 0.3. In general, the thresholds b, p, and g may be predetermined thresholds based on an empirical analysis of a test document set.

In tests using volunteers that rated the relevance of web pages to news casts, filtering was found to be particularly effective, giving a 20-30 percent improvement in the number of relevant documents with only a mild decrease in the number of relevant documents that are not returned.

CONCLUSION

Techniques for locating documents relevant to information streams were described here. The techniques are particularly useful for finding web pages that relate to the topic currently being discussed in television news broadcasts.

Other applications for the techniques described herein are possible. For example, instead of displaying web pages next to a television broadcast, web pages can be found based on a text stream typed in by a user, such as a user typing a document in a word processing program, highlighting or selecting text or multimedia information from within a file, or using a local search tool (e.g. using the "find" feature in a word processing application or a local information search application such as the "search" feature of Windows Explorer or Internet Explorer). Similarly, the information to be supplemented may be based on content extracted or derived from a file or other means other than direct user input. As one example of a possible application, a user writing a research paper utilizing a word processing tool may be presented with supplemental information related to the topic on which she is writing, or a user creating a presentation may be presented with images or "clip art" suitable for including in the presentation. As another example of a possible application, consider a search engine geared to returning current news articles or a web page containing news articles. Television broadcasts could be automatically annotated off-line with news articles from the search engine and stored. Users reading the news articles returned by the search engine may be presented with multimedia links to the television broadcasts.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A method comprising:
   automatically converting, using one or more processors, a portion of a multimedia stream to text;
   generating, using one or more processors, search queries from one or more terms extracted from the text;
   receiving, using one or more processors, ranked documents relevant to the multimedia stream based on the search queries;
   computing, using one or more processors, weights for the ranked documents based on one or more additional terms extracted from the text that were not used to identify the ranked documents,
   computing the weights for the ranked documents including:
     calculating a value, for a particular ranked document of the ranked documents, using a mathematical calculation,
       the mathematical calculation being based on a first function and a second function,
       the first function being based on:
         a frequency of occurrence of the one or more additional terms in the particular ranked document, and
         an inverse document frequency of the one or more additional terms, and
       the second function being based on the frequency of occurrence of the one or more additional terms in the particular ranked document, and
     determining the weight for the particular ranked document using the calculated value;
   re-ranking, using one or more processors, the ranked documents to obtain re-ranked documents,
     where re-ranking the ranked documents comprises modifying rankings of the ranked documents based on the computed weights; and
   providing the re-ranked documents and the multimedia stream for presentation to a user,
     the re-ranked documents being provided with the multimedia stream for presentation to the user.

2. The method of claim 1, where the search queries are automatically and periodically generated.

3. The method of claim 1, further comprising:
   transmitting the search queries to a search engine to identify the ranked documents relevant to the multimedia stream,
     the identified ranked documents being ranked according to a relevance to the search queries.

4. The method of claim 3, where the ranked documents are web pages.

5. The method of claim 1, where re-ranking the ranked documents further comprises:
   filtering the ranked documents to remove at least one of the ranked documents that is dissimilar to the text derived from the multimedia stream.

6. The method of claim 1, where re-ranking the ranked documents further comprises:
   calculating a similarity value between the ranked documents.

7. The method of claim 1, where re-ranking the ranked documents further comprises:
   calculating a similarity value between the text and the ranked documents.

8. The method of claim 1, where generating the search queries includes:

calculating, for each term in a segment of the text, a product tf·idf,
where tf refers to a frequency of the term in the segment and idf refers to an inverse document frequency, and
selecting a predetermined number of terms, from the segment, with highest product values out of one or more product values for one or more other terms from the segment.

9. The method of claim 1, where generating search queries includes:
calculating, for each term in a segment of the text, a product tf·idf$^2$,
where tf refers to a frequency of the term in the segment and idf refers to an inverse document frequency, and
selecting a predetermined number of terms, from the segment, with highest product values out of one or more product values for one or more other terms from the segment.

10. The method of claim 1, where generating search queries includes:
assigning terms, in a segment of the text, to groups, and
selecting terms for the search queries based on the groups.

11. The method of claim 10, where the terms, in the segment of the text, is assigned to the groups based on stems of the terms in the segment of the text.

12. The method of claim 10, where generating search queries include:
using segments of the text, previous to the segment of text, when generating the search queries.

13. The method of claim 1, where the multimedia stream is a television signal.

14. A system comprising:
a user device to:
automatically convert a portion of a multimedia stream to text;
periodically generate search queries based on one or more terms from the text converted from the multimedia stream,
a set of ranked web documents, related to topics in the multimedia stream, being identified based on the search queries;
compute weights for the set of ranked web documents based on one or more additional terms from the text that were not used to generate the search queries,
when computing the weights for the ranked documents the user device to:
calculate a value, for a particular ranked web document of the set of ranked web documents, using a mathematical calculation,
the mathematical calculation being based on:
a first function that is based on a frequency of occurrence of the one or more additional terms in the particular ranked web document and an inverse document frequency of the one or more additional terms, and
a second function that is based on the frequency of occurrence of the one or more additional terms in the particular ranked web document, and
determine the weight for the particular ranked document using the calculated value,
modify rankings of the set of ranked web documents based on the computed weights to obtain a set of re-ranked web documents; and
concurrently present information regarding the multimedia stream and the set of re-ranked web documents.

15. The system of claim 14, where the multimedia stream is a television signal.

16. The system of claim 14, where the user device includes at least one of:
a computer monitor, or
a television set.

17. The system of claim 14, where the user device, when modifying the rankings of the set of ranked web documents, is further to:
filter the set of ranked web documents to remove web documents, in the set of ranked web documents, that are dissimilar to the text.

18. The system of claim 14, where the user device, when modifying the rankings of the set of ranked web documents, is further to:
calculate a similarity value between the text and the set of ranked web documents.

19. The system of claim 14, where, when periodically generating the search queries, the user device is further to:
calculate, for each term in a segment of the text, a product tf·idf,
where tf refers to a frequency of the term in the segment and idf refers to an inverse document frequency, and
select a predetermined number of terms, from the segment, with highest product values.

20. The system of claim 14, where, when periodically generating the search queries, the user device is further to:
calculate, for each term in a segment of the text, a product tf·idf$^2$,
where tf refers to a frequency of the term in the segment and idf refers to an inverse document frequency; and
select a predetermined number of terms, from the segment, with highest product values out of one or more product values for one or more other terms from the segment.

21. The system of claim 14, where the user device is further to:
assign terms in a segment of the text to groups, and
select terms for the search queries based on the groups.

22. The system of claim 21, where the terms, in the segment of the text, are assigned to the groups based on stems of the terms.

23. The system of claim 21, where, when periodically generating the search queries, the user device is further to:
use segments of the text, previous to the segment of text, when generating the search queries.

24. A device comprising:
a processor to execute instructions to:
automatically convert a portion of a multimedia stream to text;
generate one or more search queries using one or more terms from the text;
receive a set of ranked documents relevant to the multimedia stream based on the one or more search queries;
compute weights for the set of ranked documents based on one or more additional terms from the text that were not used to identify the set of ranked documents
when computing the weights for the set of ranked documents, the processor is to:
calculate a value, for a particular ranked document of the set of ranked documents, using a mathematical calculation,
the mathematical calculation being based on a first function and a second function,
the first function being based on:

a frequency of occurrence of the one or more additional terms in the particular ranked document, and an inverse document frequency of the one or more additional terms, and the second function being based on the frequency of occurrence of the one or more additional terms in the particular ranked document, and determine the weight for the particular ranked document using the calculated value; and modify rankings of the set of ranked documents, based on the computed weights, to obtain a set of re-ranked documents, the set of re-ranked documents being provided with the multimedia stream for presentation.

25. A computer-readable medium storing instructions, the instructions comprising:

a plurality of instructions that when executed by a processor, cause the processor to:

automatically convert a portion of a multimedia stream to text;

generate one or more search queries from the text;

receive ranked documents relevant to the multimedia stream based on the one or more search queries;

compute weights for the ranked documents based on one or more additional terms, from the text, that were not used to identify the ranked documents, one or more instructions, of the plurality of instructions, to compute the weights for the ranked documents including:

one or more instructions to calculate a value, for a particular ranked document of the ranked documents, using a mathematical calculation, the mathematical calculation being based on:

a first function that is based on a frequency of occurrence of the one or more additional terms in the particular ranked document and an inverse document frequency of the one or more additional terms, and a second function that is based on the frequency of occurrence of the one or more additional terms in the particular ranked document, and one or more instructions to determine the weight for the particular ranked document using the calculated value;

modify rankings of the ranked documents, based on the computed weights, to obtain re-ranked documents; and present the re-ranked documents to a user simultaneously with the multimedia stream.

26. The computer-readable medium of claim 25, where the one or more search queries are periodically generated.

27. The computer-readable medium of claim 25, the instructions further comprising:

one or more instructions to remove at least one search term from the one or more search queries to form one or more new search queries when no documents can be identified based on the one or more search queries.

28. The device of claim 24, where, when receiving the set of ranked documents, the processor is further to:

filter the received documents to remove at least one of the set of ranked documents that is dissimilar to the text converted from the multimedia stream.

29. The device of claim 24, where, when receiving the set of ranked documents, the processor is further to:

calculate a similarity value between the set of ranked documents.

30. The device of claim 24, where the first function is further based on a frequency of occurrence of the one or more additional terms in a title of the particular ranked document.

\* \* \* \* \*